RIDGE REAMER

Original Filed Sept. 18, 1950 2 Sheets-Sheet 1

INVENTOR.
Henry Robert Billeter,
BY
Fidler, Crane & Beardsley
Attys.

RIDGE REAMER

Original Filed Sept. 18, 1950 2 Sheets-Sheet 2

INVENTOR.
Henry Robert Billeter,
BY
Fidler, Crouse & Beardsley
Attys

United States Patent Office

Re. 24,039

Reissued July 19, 1955

24,039

RIDGE REAMER

Henry Robert Billeter, Deerfield, Ill., assignor to Ammco Tools, Inc., North Chicago, Ill., a corporation of Illinois Original No. 2,638,799, dated May 19, 1953, Serial No. 185,396, September 18, 1950. Application for reissue August 25, 1954, Serial No. 452,234

8 Claims. (Cl. 77—2)

Matter enclosed in heavy brackets [ ] appears in the original patent but forms no part of this reissue specification; matter printed in italics indicates the additions made by reissue.

This invention relates generally to reamers and has to do particularly with reamers of the type adapted to remove ring-wear ridges from internal combustion engine cylinders.

The movement of a piston in a cylinder wears the cylinder wall, increasing the diameter of the cylinder, and since the uppermost piston ring does not reach the top of the cylinder, a ridge is left adjacent the top of the cylinder wall. In reconditioning cylinders it is often necessary to remove this ridge to permit removal of the piston and in all instances removal of the ridge is desirable to insure proper functioning of the newly installed rings.

Ridge reamers of the type to which the present invention relates are often provided with resilient means such as a metallic coil spring for yieldingly maintaining the cutting blade in contact with the ridge to be reamed. However it has been found that in cutting certain ridges, for example those formed in the cylinders of diesel engines, it is necessary to provide a stiff, high pressure spring to exert the required pressure on the blade. Such a spring renders the reamer unsuitable for cutting ridges which are not so hard.

An object of the present invention therefore is to provide a ridge reamer having a cutting blade so mounted and supported that the reamer is adapted for cutting a wide range of ridges of varying hardness without interfering with the desired action of the blade in cutting the ridge in any particular type of cylinder.

Another object is to provide a ridge reamer wherein the cutting blade is supported for sliding and rocking movement in the blade carrier, whereby the blade is adapted to contact the cylinder ridge suitably to cut away the ridge in the desired manner and is at the same time resiliently maintained in firm cutting engagement with the ridge during the cutting operation.

A further object is to provide a ridge reamer in which the cutting blade is suitably supported resiliently for engagement with the ridge and at the same time is substantially prevented from chattering or vibrating during the cutting operation.

Still another object is to provide a ridge reamer having novel means for supporting and resiliently maintaining the cutting blade in cutting engagement with the ridge which means is not easily broken or otherwise damaged in normal use and consequently will remain fully effective over a long period of use.

A further object is to provide a ridge reamer of very simple construction which is easy and inexpensive to manufacture and assemble, is rugged and not readily damaged and is fully effective in operation.

Another object is to provide a ridge reamer wherein the cutting blade is movable toward and away from the ridge and maintained in contact with the ridge by yieldable resilient means which maintains its resiliency through the entire range of movement of the blade.

Another object is to provide a ridge reamer of the type having a plurality of expansible and contractible guides adapted to be expanded into contact with the cylinder walls, in which ridge reamer the guides are so arranged that they are capable of a maximum expansion and contraction for any particular size of reamer, thereby permitting the use of the reamer for reaming cylinders throughout a wide range of sizes.

A further object is to provide a ridge reamer of the expansible and contractible type wherein the guides are effectively supported for easy expansion and contraction and are firmly held in any cutting position, which reamer is formed by a very small number of separate parts thereby permitting the reamer to be manufactured inexpensively and at the same time minimizing the likelihood of malfunctioning.

Other objects and advantages will be apparent upon reference to the following detailed description and to the accompanying drawings wherein, Figure 1 is a side elevational view of the ridge reamer of the present invention shown in position in an engine cylinder, the latter being shown fragmentarily and in section;

Figure 1:
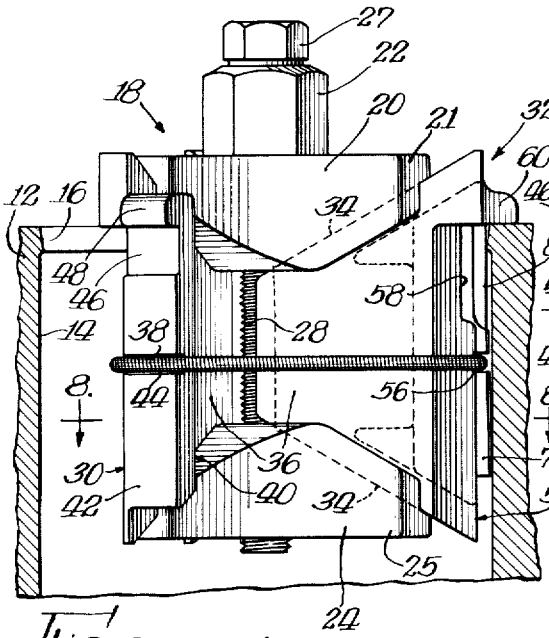
Figure 3:
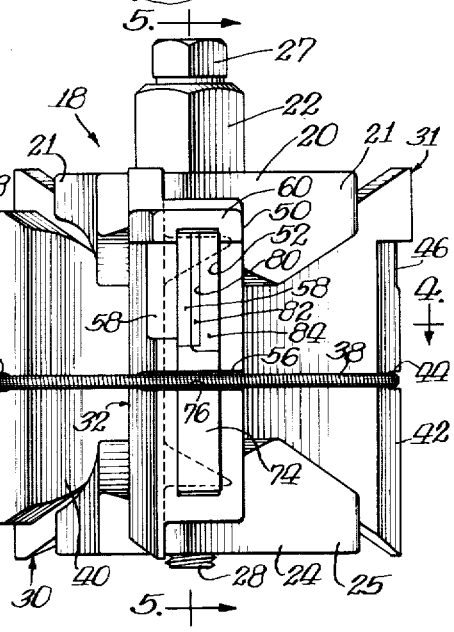
Fig. 3 is a view from the right of Fig. 1, this figure omitting illustration of the cylinder.

Referring now in detail to the drawings, Fig. 1 illustrates the ridge reamer of the present invention as a whole inserted into a cylinder 12 of an internal combustion engine such as an automobile engine. The cylinder wall 14 of the engine, upon long continued movement of the piston in the cylinder, is worn by the action of the piston rings and because the uppermost piston ring does not reach the top of the cylinder a ridge such as 16 is formed. The ridge, it will be understood, is illustrated in the drawings in exaggerated condition.

Figure 2:
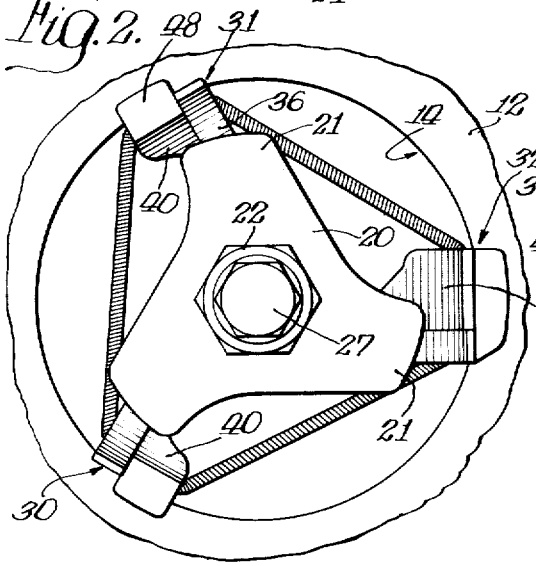
Fig. 2 is a top plan view of the ridge reamer.

The ridge reamer comprises a body portion 18 which includes a top end member 20 of generally triangular shape, as viewed in Fig. 2, having outwardly extending arms 21 and possessing substantial axial thickness at its center. The top end member 20 is provided with a polygonal drive shank 22 in the form of a nut adapted for engagement by convenient operating means for rotating the ridge reamer. The drive shank 22 may be secured in place by imbedding it in the end member 20 in the casting operation of the latter. The body member 18 also includes a bottom end member 24 similar in shape to the top end member 20, having outwardly extending arms 25. The shank 22, as well as top end member 20, are each provided with a hole 26 for the reception of an expanding screw 27 loosely slidable therein, the lower end 28 of which screw being threaded into an interiorly threaded hole 29 in the bottom end member 24.

Figure 4:
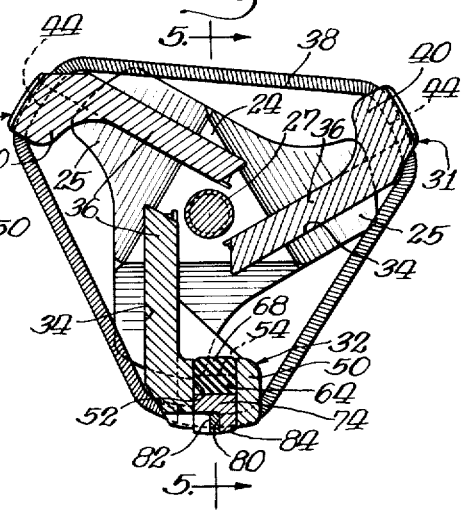
Fig. 4 is a horizontal sectional view taken on line 4—4 of Fig. 3.
Figure 8:
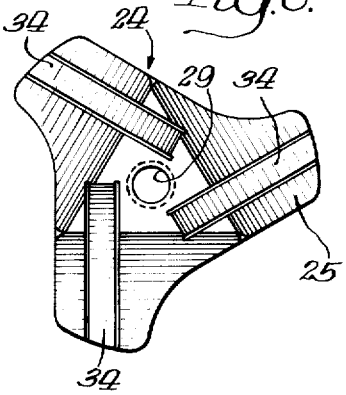
Fig. 8 is a top plan view of the bottom end member making up part of the body member of the ridge reamer.

Supporting and guiding members 30, 31 and 32 are slidably mounted in grooves 34 in the end members 20 and 24, the grooves being disposed tangent to a small base circle concentric with the axis of the device, as seen in Figs. 4 and 8, and extending outwardly in the arms 21 and 25 of the top and bottom end members. The supporting and guiding members 30, 31 and 32, which will be hereafter referred to as guides for convenience, include blade-like portions 36, which fit in the respectively aligned grooves 34 in the end members 20 and 24 for sliding movements of the guides outwardly and inwardly of the body portion. The blade-like portions 36 and the grooves 34 form effective tongue-and-groove connections between the body member 18 and the guides 30, 31 and 32, through which rotary motion of the body member is transmitted to the guides.

It will be noted that the sole connection between the end members and the guides is through the tongue-and-groove connections referred to and there are no other connections such as guide posts employed in certain previous types of ridge reamers. Accordingly, a simple and rugged article is produced. Moreover, the elimination of such guide posts permits the guides to be readily arranged in a novel manner as hereinafter described.

The upper and lower edges of the blade-like portions 36 converge inwardly of the device and the grooves 34 are complementally inclined to accommodate the inclination of the edges of the blade-like portions to produce a wedging effect for forcing the guides 30, 31 and 32 outwardly; this operation is accomplished by turning the screw 26 whereby the screw stem is threaded into the bottom end member forcing the latter upwardly relative to the top end member, thereby forcing the guides outwardly. The guides are retained in place by and are retracted inwardly by a surrounding garter spring 38 when the end members are permitted to move relatively apart.

As mentioned above the guides 30, 31 and 32 extend tangent to a base circle concentric with the axis of the device and by reason of this feature they are enabled to be retracted into the device an extent greater than would be the case if they were disposed radially. If they were disposed radially, they would be limited in their inward movement by the screw stem 28 but, because of their tangential relation as referred to, they are permitted to move in effect in bypassing relation to the screw stem.

Each of the guides 30 and 31 is formed to serve as a guide shoe and accordingly is provided with a circumferentially offset portion 40 adjacent its outer edge and each portion 40 has a smooth radial outer surface 42 engageable with the cylinder wall 14 for guiding the ridge reamer in its operating movements. The portions 40 are provided with grooves 44 for receiving the garter spring 38, the grooves being of sufficient depth that the spring does not drag on the cylinder wall. The outer surface of each portion 40 at its upper end is provided with a recess or cutout portion 46 for accommodating the ridge 16 and each is also provided with a ledge or overhanging projection 48 for engaging the upper surface of the engine block for supporting the ridge reamer in the cylinder.

At least one of the guides is adapted to carry a cutting blade presently to be described. The blade carrier guide 32 has a circumferentially offset portion 50 adjacent its radial outer edge generally similar to the portion 40 of the members 30 and 31 but of greater dimension in a direction circumferentially of the reamer. The portion 50 is provided with an elongated recess 52 disposed vertically when the ridge reamer is in operating position as shown in Fig. 1. The recess is substantially rectangular in cross section and of substantially greater vertical height than width. The inner wall of the recess 52 is provided with an aperture 54 for receiving a projection on the blade equalizer to be referred to later. The side walls of the recess 52 are provided with notches 56 for receiving the garter spring 38. One of the walls of the recess 52 is cut back at 58 adjacent its upper end. At the upper end of the portion 50 is a ledge or overhanging projection 60 serving a purpose similar to that of the portions 48 and also having a cutout 62 forming an extension of and being in alignment with the recess 52.

A backing up member 64, hereinafter referred to as a "blade equalizer," is associated with the cutting blade for the purpose of resiliently resisting the inward movement of the cutting blade caused by the resistance to cutting offered by the ridge during rotational operation of the reamer, and to urge the cutting blade outwardly after sudden inward thrusts thereof, as well as to progressively urge the cutting blade outwardly as the ridge is gradually cut away.

The blade equalizer 64 is composed of an elastomer, a name applied to materials having certain properties of rubber. Any desired material may be employed so long as it possesses the desired characteristics and properties, those characteristics or properties being, resiliency, elasticity, yieldability, distortability, a certain degree of hardness, and freedom from permanent set. The blade equalizer must yield under the influence of the cutting blade but it must have the necessary hardness to provide the desired resilient resistance to inward movement of the blade and to urge the cutting blade outwardly, and it must also be elastic so that it fully restores to its original shape and condition. However, the material is of such nature that restoration of the blade equalizer to its normal condition is not instantaneous but takes place after a temporary delay or, in other words, it takes a temporary set, there being a small time lag in the restoration of the material to its normal condition. It is to be noted, however, that the material does not take a permanent set. While natural rubber may be employed it is preferable to employ a synthetic rubber having the desired properties because of its greater resistance to the deleterious effects of oils and greases. Examples of materials which have been found suitable are the synthetic material sold by E. I. du Pont de Nemours Company under the trade name "neoprene" and that sold by B. F. Goodrich Company under the trade name "HyCar."

The blade equalizer 64 is of considerably less axial dimension than the recess 52, but of a width only slightly less than the recess, e. g. approximately 1/32" less in width. The rear surface of the blade equalizer indicated at 66 is planar for engaging the wall of the recess, the blade equalizer having a projection 68 fitted in the aperture 54 when the blade equalizer is set in position. The aperture 54 is so positioned that when the blade equalizer is put in position in the recess, the equalizer is located adjacent the upper portion of the recess as shown clearly in Fig. 5, but with its upper end spaced from the top wall of the recess whereby it is permitted ready spreading or distortion upwardly. The outer surface 70 of the blade equalizer is normally arcuate as shown in Fig. 6, being curved about a transverse axis.

The cutting blade assembly 72 is inserted in the recess 52 in engagement with the blade equalizer. The cutting blade assembly includes a block 74 having a groove 76 for receiving the garter spring 38 and a cutout portion 78 adjacent its upper end and on one side forming a shoulder 80 which is disposed substantially radially of the reamer. The cutting blade proper or tip 82 is fitted against the shoulder 80 and permanently secured thereto as by brazing. The cutting blade 82 is of the desired hardness and having the necessary cutting edge for cutting the ridge 16 in the operation of the device. The cutting blade slopes upwardly and outwardly a slight extent on the order of about one-half of one degree (0°30′) to assure completely cutting the ridge 16 from the cylinder wall. The outer cutting surface of the blade 82 and the surface 84 of the block together are slightly inclined from a plane perpendicular to the respective radius of the device so that the cutting blade presents a clean cutting edge for engaging the ridge 16 upon appropriate rotation of the device clockwise as viewed in Fig. 4. The cutting blade assembly, when fitted in the recess 52, is positioned with its upper end in the cutout portion 62 and with its rear surface engaging the arcuate surface 70 of the equalizer.

In operation, the ridge reamer in suitably controlled condition is inserted in the cylinder to be reamed with the projections 48 and 60 overlying the top rim of the cylinder. The reamer is expanded by turning the expanding screw, to urge the guides and blade into engagement with the ridge to be reamed. The reamer is properly adjusted in the cylinder and the expanding screw turned to further expand the reamer and thus place the blade equalizer under the desired compression. The reamer is then suitably rotated by any suitable tool applied to the drive shank.

Figure 5:
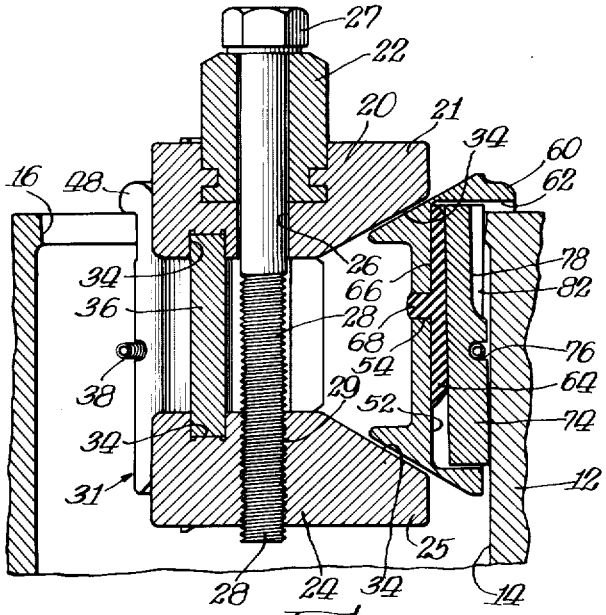
Fig. 5 is a vertical sectional view of the ridge reamer taken on line 5—5 of Fig. 4, and showing also fragmentarily and in section an engine cylinder with the ridge reamer in position therein.
Figure 7:
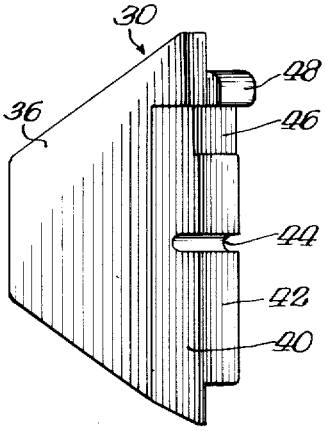
Fig. 7 is a perspective view of one of the guides.
Figure 6:
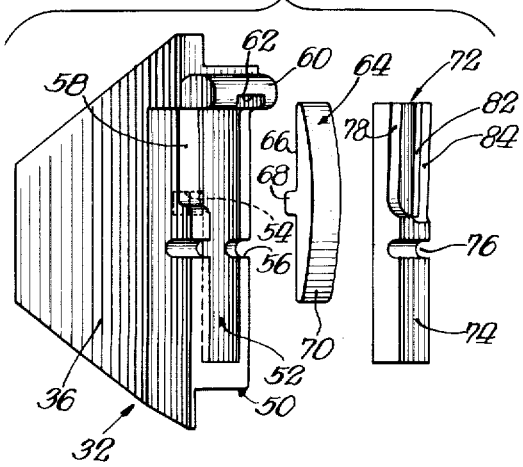
Fig. 6 is an exploded perspective view of the guide which forms a blade carrier for the cutting blade, together with the cutting blade itself and the blade equalizer.

As shown in Fig. 5, the cutting blade assembly 74 engages the cylinder wall with the lower end thereof in direct engagement with the cylinder wall below the ridge and the cutting blade in engagement with the ridge 16, resulting in the cutting blade assembly sloping downwardly and outwardly to a slight degree. As the ridge 16 is progressively cut off, the upper end of the cutting blade assembly is urged outwardly under the action of the blade equalizer until the ridge is finally cut away, whereupon the lower portion of the cutting blade assembly is positioned substantially vertically and bears substantially its full length on the main portion of the cylinder wall, while the cutting blade 82 produces a slight outward taper or flare in the upper end of the cylinder wall. This taper is, of course, only slight because the inclination of the cutting blade is slight as mentioned above. The cutting blade initially engages only the lower portion of the ridge in those cases where a ridge was previously cut away leaving a flared surface; upon outward movement of the cutting blade, it progressively cuts away a greater vertical portion of the ridge until it has finally removed the ridge, leaving the tapered or flared portion referred to above.

Because the blade equalizer is positioned in the upper end of the recess, and hence adjacent the upper end of the cutting blade assembly, it bears directly against the end of the blade assembly carrying the blade and is therefore highly effective for urging the cutting blade outwardly into ridge-cutting position.

The arcuate surface 70 of the blade equalizer facilitates the progressive changes in inclination of the cutting blade assembly 74, i. e., the blade assembly is permitted easy rocking over the arcuate surface.

Because of the curvature of the surface 70 the cross sectional dimensions of the blade equalizer are not uniform in a direction longitudinally of the equalizer and because of this feature the reaction of the equalizer to inward movement of the cutting blade assembly progressively increases in proportion to the force urging the cutting blade assembly inwardly. In the first increment of movement of the cutting blade assembly the blade equalizer is permitted to yield readily because the small portion thereof in engagement with the cutting blade assembly is enabled to spread relatively readily. However, as the cutting blade assembly is moved further inwardly, the blade equalizer is further flattened, whereupon there is a greater mass of material to be moved in response to the movement of the cutting blade assembly, resulting in progressively increased resistance to yieldability relative to unit force applied. By reason of this feature, the cutting blade is effective for cutting hard cylinders and wide ridges which require more resistance to inward displacement of the blade in order to cause it to cut away the ridge than softer cylinders or narrower ridges.

As the device is operated and the cutting blade cuts the ridge 16 there is, of course, a strong force tending to urge the cutting blade assembly radially inwardly. This force distorts the blade equalizer causing the latter to spread under the influence thereof, and the equalizer tends to restore to normal, urging the cutting blade assembly outwardly. The blade equalizer will spread laterally only a slight degree until confined against further spreading by the side walls of the recess, but it is permitted to spread longitudinally or vertically to a great degree, being permitted to spread vertically at both ends readily. When a slight force is exerted by the cutting blade assembly against the equalizer the latter is permitted to spread in both transverse directions. However, when a greater force is exerted, the blade equalizer is spread sideways and soon engages the side walls of the recess whereupon it is limited from further spreading in that direction; additional spreading takes place only longitudinally or vertically and since it can spread only in one transverse direction its effective yieldability is lessened and it therefore exerts a greater reaction to the inward force of the cutting blade assembly. It will thus be seen that the blade equalizer produces an effect similar to the combined effect of a weak spring and a strong spring.

It is believed clear that the device of the present invention is effective for uniformly cutting or reaming a ridge in a cylinder wall regardless of the condition of the various portions of the ridge.

The fact that the material of the blade equalizer 64 takes a slight temporary set upon compression and does not instantly restore to normal condition, substantially eliminates chattering of the cutting blade during a ridge reaming operation. Contrast is made with previously known devices employing such elements as springs for urging the cutting blade outwardly into cutting position. Springs and similar devices almost instantaneously restore to their normal position after being compressed, but in the present invention restoration of the blade equalizer is effected after only a slight delay. If the cutting blade encounters, for instance, a hard portion of a ridge and consequently is suddenly forced inwardly a greater than normal amount, the blade equalizer does not instantaneously force the blade outwardly but does so after only a slight delay and during this delay the cutting blade will have been rotated into such a new position that includes a "high spot," or the blade equalizer may return the cutting blade outwardly in such manner that the cutting blade comes into engagement again with the ridge more gradually, whereby in either case chattering of the blade is substantially limited.

The material from which the blade equalizer is made permits deformation thereof to take place throughout, and beyond, the range of movement of the blade. The resistance of the blade equalizer to deformation, and consequently to the inward movement of the blade, increases more than proportionately to the force causing the deformation. Hence, when the blade is expanded outwardly into contact with the ridge to only a slight extent, the equalizer exerts only a slight resistance, but when the blade is expanded outwardly to a greater extent, the equalizer exerts a resistance greater in proportion to the greater force tending to move the blade inwardly.

The characteristics and properties of the rubber-like material of the blade equalizer as set out above, together with its shape and position in the recess, produce a characteristic yieldable reaction to the inward movement of the cutting blade assembly. In the first portion thereof the reaction of the blade equalizer is substantially in direct proportion to the unit force applied thereto and in the latter portion the reaction is substantially increased in proportion to the unit force applied.

It will be noted that there is practically no limit to the yieldability of the blade equalizer, regardless of the extent of yielding in a particular condition, it can yield a greater extent upon the application of additional force.

While I have herein shown a preferred embodiment of the invention, it is understood that certain changes may be made within the scope of the appended claims.

I claim:

1. A rotatable cylinder ridge reamer comprising top and bottom end members movable toward and from each other to expand and contract the reamer, respectively, opposing faces of each of said end members having a plurality of grooves extending tangentially to a base circle concentric with the axis of rotation of the reamer, means for moving said end members toward each other to expand the reamer including a member disposed on the axis of the reamer within the confines of said base circle and threadedly engaged with one of said end members and slidable through the other, guide members disposed between and guidingly supported by said end members, each said guide member having a body element and a head element with the top and bottom edges of said body element converging inwardly away from said head element and slidably mounted in said end member grooves for slide movement inwardly and outwardly past the axis of the reamer, each said head element extending circumferentially from the outer edge of its respective body element to such an extent that it moves in a radial plane through said axis as said body element is moved inwardly and outwardly of said end member grooves, means for supporting the ridge reamer as a whole for rotation in a cylinder to be reamed, a reamer blade assembly carried by one of said head elements and adapted to engage the cylinder ridge to be reamed, and means yieldably retaining said guide members in said end member grooves and constantly urging said guide members inwardly.

2. A cylinder ridge reamer adapted to be rotated in a cylinder and comprising opposed top and bottom end members each having at least three similarly arranged grooves in their opposing faces extending tangentially to a base circle concentric with the axis of rotation of said ridge reamer, means including an expansion member extending on said axis, within the base circle, and slidably through one of said end members and rigidly and adjustably connected to the other of said end members for moving said end members toward each other, guide members extending between said end members, each of said guide members having a body formed with top and bottom edges converging inwardly and slidable in said grooves inwardly and outwardly past said axis as said end members are moved toward and away from each other, said grooves being arranged whereby the medial longitudinal plane of each body intersects another of said bodies at a point between the axis and the outer edge of said body, at least one of said bodies having a head parallel to and circumferentially offset from the body in position to move in a radial plane passing through said axis as said body is moved inwardly and outwardly, a cutting blade assembly removably carried in the outer edge portion of said head, resilient backing means between said blade assembly and said head, and located on both sides of a medial transverse plane through said assembly, and means yieldably urging said guide members inwardly.

3. A cylinder ridge reamer adapted to be rotated in a cylinder and comprising opposed top and bottom end members each having at least three similarly arranged grooves in their opposing faces extending tangentially to a base circle concentric with the axis of rotation of said ridge reamer with the grooves of each end member converging inwardly toward the other end member, means including an expansion member extending on said axis, within the base circle, and slidably through said top end member, and rigidly and adjustably connected to said bottom end member for moving said end members toward each other, guide members extending between said end members, each of said guide members having a body formed with top and bottom edges converging inwardly complementally to said grooves and slidable in said grooves inwardly and outwardly past said axis as said end members are moved toward and away from each other, said grooves being arranged whereby the medial longitudinal plane of each body intersects another of said bodies at a point between the axis and the outer edge of said body, at least one of said bodies having a head parallel to and circumferentially offset from the body in position to move in a radial plane passing through said axis and said head and formed with an outwardly extending supporting projection at its upper end, the outer face of said head and the lower face of said projection having therein a continuous, elongate recess, an elongate cutting blade assembly removably carried in said recess having a cutting edge on its upper portion, and means yieldably urging said guide members inwardly.

4. A cylinder ridge reamer adapted to be rotated in a cylinder and comprising opposed top and bottom end members, means connecting said end members for moving them toward each other, a plurality of guide members carried between said end members and slidable outwardly with respect thereto upon movement of said guide members toward each other, one of said guide members having an elongate, outwardly opening recess in its outer surface formed with a generally flat bottom wall, an elongate rubber-like backing member disposed in said recess tapering in thickness from its central portion toward each end and having a generally flat inner surface seated against the bottom wall of the recess, a cutting blade assembly in said recess and having an elongate body formed with a generally straight inner edge seated against the outer surface of said backing member and a cutting edge along a portion of its outer edge, said backing member being shorter than but not substantially narrower than said recess, whereby it is restrained against lateral expansion but free to expand longitudinally upon compression by said blade assembly, and means yieldably urging said guide members inwardly.

5. A cutting blade and supporting guide assembly for a cylinder ridge reamer, said assembly comprising a guide member having a body formed with a side edge portion and top and bottom edge portions converging from said side edge portion and a head portion offset laterally from said body adjacent said side edge portion and having an elongate groove extending longitudinally in the face thereof and substantially in a medial longitudinal plane through said head, an elongate cutting blade member removably disposed in said groove and having a cutting edge on one portion thereof, and resilient backing means disposed in said groove between said cutting blade member and the bottom of said groove.

*6. A rotatable cylinder ridge reamer comprising top and bottom end members, the opposing face of each of said end members having a plurality of grooves converging inwardly from the outer edge thereof, guide-support members disposed between said end members, each said guide-support member having a body element and a head element with the top and bottom edges of said body element converging inwardly away from said head element and slidably mounted in said end member grooves for slide movement inwardly and outwardly to contract and expand the reamer, respectively, said guide-support members comprising the sole drive connection between said end members, means for moving said end members toward each other to move said guide-support members outwardly to expand the reamer, a reamer blade assembly including a radially movable blade carried by one of said head elements, and resilient means acting directly upon said reamer blade urging said blade outwardly toward the ridge to be reamed.*

*7. A rotatable cylinder ridge reamer comprising top and bottom end members, the opposing face of each of said end members having a plurality of grooves converging inwardly from the outer edge thereof, guide-support members disposed between said end members, each said guide-support member having a body element and a head element with the top and bottom edges of said body element converging inwardly away from said head element and slidably mounted in said end member grooves for slide movement inwardly and outwardly to contract and expand the reamer, respectively, said guide-support members comprising the sole drive connection between said end members, means for moving said end members toward each other to move said guide-support members outwardly to expand the reamer including a rigidly-acting rotatable adjusting member disposed on the axis of the reamer and threadedly engaged with one of said end mem-*

*bers and slidable through the other, means carried by said guide-support members for supporting the ridge reamer as a whole upon and for rotation in the cylinder to be reamed, a reamer blade assembly carried by one of said head elements and having a reamer blade portion adapted to engage the cylinder ridge to be reamed and a cylinder wall contacting portion which together with the other guide-support members serves to support and guide the reamer rotatively in the cylinder, and resilient means disposed behind and acting directly upon said reamer blade portion and comprising the sole means resiliently urging the reamer blade portion toward the ridge to be reamed, and means yieldably retaining said guide-support members in said end member grooves and constantly urging said guide-support members inwardly.*

*8. A rotatable cylinder ridge reamer comprising top and bottom end members movable toward and from each other, the opposing face of each of said end members having a plurality of grooves converging inwardly toward the other end member and extending tangentially to a base circle concentric with the axis of rotation of the reamer, supporting and guide members disposed between and supported by said end members, each said supporting and guide member having a body element and a head element with the top and bottom edges of said body element converging inwardly away from said head element and slidably mounted in said end member grooves for slide movement inwardly and outwardly past the axis of the reamer as said end members are moved toward and from each other, said supporting and guiding members com-*

*prising the sole driving connection between said end members, means for moving said end members toward each other to expand the reamer including a member disposed on the axis of the reamer within the confines of said base circle and threadedly engaged with one of said end members and slidable through the other, means carried by said guiding and supporting members for supporting the ridge reamer as a whole upon and for rotation in the cylinder to be reamed, a reamer blade carried by one of said head elements and having a cutting edge portion adapted to engage the cylinder ridge to be reamed and a guide portion adapted to engage the wall of the cylinder, said guide portion together with the other of said guiding and supporting members rotatably guiding and supporting the reamer in the cylinder, resilient means between said reamer blade and its supporting head element comprising the sole means urging said cutting edge portion into engagement with the ridge to be reamed, and means yieldably retaining said guide members in said end member grooves and constantly urging said guide members inwardly.*

References Cited in the file of this patent or the original patent

UNITED STATES PATENTS

| | | |
|---|---|---|
| 700,825 | Ritter, Jr. | May 27, 1902 |
| 1,491,621 | Pfander et al. | Apr. 22, 1924 |
| 1,980,288 | Olson | Nov. 13, 1934 |
| 2,637,224 | Mitchell | May 5, 1953 |